United States Patent
Iwakuni

[11] Patent Number: 5,835,052
[45] Date of Patent: Nov. 10, 1998

[54] RADAR DETECTOR AND THE ADJUSTMENT SYSTEM AND METHOD THEREOF

[75] Inventor: Mikio Iwakuni, Tokyo, Japan

[73] Assignee: Uniden Corporation, Tokyo, Japan

[21] Appl. No.: 909,063

[22] Filed: Aug. 14, 1997

[30] Foreign Application Priority Data

Mar. 12, 1997 [JP] Japan .................................. 9-057843

[51] Int. Cl.⁶ .......................................................... G01S 7/40
[52] U.S. Cl. .............................. 342/20; 342/100; 455/227
[58] Field of Search ................................. 342/20, 98, 99, 342/100; 455/227, 228

[56] References Cited

U.S. PATENT DOCUMENTS

| | | | |
|---|---|---|---|
| 4,626,857 | 12/1986 | Imazeki | 342/20 |
| 4,698,632 | 10/1987 | Baba et al. | 342/17 |
| 4,709,407 | 11/1987 | Baba | 455/226.1 |
| 5,068,663 | 11/1991 | Valentine et al. | 342/20 |
| 5,146,227 | 9/1992 | Papadopoulus | 342/20 |
| 5,305,007 | 4/1994 | Orr et al. | 342/20 |
| 5,315,302 | 5/1994 | Katsukura et al. | 342/20 |
| 5,461,383 | 10/1995 | Ono et al. | 342/20 |
| 5,666,120 | 9/1997 | Kline et al. | 342/20 |

FOREIGN PATENT DOCUMENTS

| | | |
|---|---|---|
| 58-131184 | 7/1984 | Japan . |
| 59-109970 | 7/1984 | Japan . |
| 61-18676 | 8/1986 | Japan . |
| 6-174826 | 6/1994 | Japan . |
| 7-35845 | 2/1995 | Japan . |

*Primary Examiner*—John B. Sotomayor
*Attorney, Agent, or Firm*—McDermott, Will & Emery

[57] ABSTRACT

Disclosed is a radar detector for frequency sweeping a wide band range by using a VCO circuit to detect a radar signal, wherein the frequency precision of the received band can be improved by using comparatively simple and inexpensive circuits. This radar detector comprises an antenna for receiving radar signals, a voltage controlled oscillator which receives a controlled signal and generates a signal of a frequency corresponding thereto, a receiving section which demodulates the radar signal received by said antenna based on the output signal of said voltage controlled oscillator, a sweep signal generating section which generates and supplies a sweep signal to said voltage controlled oscillator as said controlled signal, a memory section which stores data indicating the relation between said sweep signal and oscillating frequency in advance, and a controlling section which, after detecting a radar signal demodulated by said receiving section, decides the received frequency of said radar signal by comparing the controlled signal of said voltage controlled oscillator with the data in said memory section. The memory section stores the actual characteristics of the voltage controlled oscillator, so that a correct distinction is possible.

16 Claims, 7 Drawing Sheets

RADAR DETECTOR AND THE ADJUSTMENT SYSTEM AND METHOD THEREOF

BACKGROUND OF THE INVENTION

1. Field of the Invention

The present invention relates to a radar detector for detecting microwave signals transmitted from a microwave generator such as a radar gun which is a device for measuring the running speed of cars.

2. Description of the Related Art

FIG. 7 shows an example of a 3-band radar detector structure which covers the bands X, K and Ka.

A high frequency signal from a radar gun (not illustrated) received by antenna (ANT) 1 is input into mixer (MIX) 3 after a signal of a predetermined band has been eliminated by band rejection filter (BRF) 2. In mixer 3, the received high frequency signal is mixed with the output signal from one of local oscillators (OSC) 11-1 through 11-3, and a signal of a frequency of the difference between the frequencies of the mixed signals (first intermediate frequency signal) is output therefrom. The output signal of mixer 3 is amplified by intermediate frequency amplifier (IFA) 4 and then input into mixer 5. In mixer 5, the intermediate frequency signal output from mixer 3 is mixed with the output signal from one of voltage controlled oscillators (VCO) 12-1 through 12-3, and a signal of a frequency of the difference between the frequencies of the mixed signals (second intermediate frequency signal) is output therefrom. Only the signal of a desired frequency band is taken out from the output of mixer 5 at band pass filter (BPF) 6, which is then amplified by amplifier (AMP) 7 and input to FM detector (FMDET) 8. The output signal of FM detector 8 is compared with a predetermined threshold value via comparator (COMP) 9, and only the signal from this threshold value upwards is output. The output signal from comparator 9 is input into saw wave generator 10 and delay means 13. The output of saw wave generator 10 is compared with a predetermined threshold value Vth via comparator 18. The output of delay means 13 and that of comparator 18 are input into the RD Sig IN terminal and the TMG terminal of controlling M-COM 14, respectively. M-COM 14 controls local oscillator 11 and voltage control oscillator 12 based on these signals, and also calculates the detected results and outputs such results to input/output section (I/O) 15. Furthermore, M-COM 14 receives controlling signals, etc., from the input/output section 15.

Since the range of frequencies received by the receiver circuit in FIG. 7 covers a very wide frequency range, a low noise amplifier is not provided at an early stage. Furthermore, a plurality (three in the drawings) of first local oscillators 11-1 through 11-3 are provided for receiving a plurality of radar bands.

As the IF frequencies differ for each of the plurality of radar bands, and also because the Ka band within the radar bands covers a very wide area, a plurality of VCOs 12-1 through 12-3 are used as the second local oscillators.

The relation between the received frequency from each radar band and the operating frequency of the radar detector is as follows:

| Received band | Received frequency (GHz) | First local oscillator (GHz) | First IF frequency |
|---|---|---|---|
| X band | 10.525 ± 0.025 | 11.5 | 0.975 ± 0.025 |
| K band | 24.150 ± 0.1 | 11.5 × 2 = 23.0 | 0.150 ± 0.1 |
| Ka band | 33.4~34.7 | 16.2 × 2 = 32.4 | 1.0~2.3 |
| Ka band | 34.7~36.0 | 16.85 × 2 = 33.7 | 1.0~2.3 |

However, the oscillation frequency of OSC 11-1 is 11.5 GHz, that of OSC 11-2 is 16.2 GHz and that of OSC 11-3 is 16.85 GHz.

From the above relationship, it is clear that the same local oscillator 11-1 is used for the X and K bands, but the IF frequencies differ. However, when receiving a K band signal, a second harmonic signal with double the basic oscillation frequency of local oscillator 11-1 is used. As the Ka band covers a very wide range from 33.4~36.0 GHz, two first local oscillators 11-2 and 11-3 are employed, and the IF frequency is 1~2.3 GHz. When receiving a Ka band signal, a second harmonic frequency with double the basic oscillation frequency of local oscillators 11-2 and 11-3 is used.

Furthermore, the second IF frequency is usually set to a fixed frequency of some ten MHz. Accordingly, the oscillation frequency of VCO 12-1 is set to 950~1.3 GHz, that of VCO 12-2 to 1.3~1.8 GHz and that of VCO 12-3 to 1.8~2.3 GHz. Using these frequencies, a frequency range of the second IF frequency (some ten MHz) subtracted from the first IF frequency range is subjected to frequency sweep.

Concluding from the above, the combination of the first and second local oscillators and the relation to the received band is as follows:

| Received band | Received frequency (GHz) | First local oscillator | Second local oscillator |
|---|---|---|---|
| X band | 10.525 ± 0.025 | Osc 11-1 | VCO 12-1 |
| K band | 24.150 ± 0.1 | Osc 11-1 (double freq.) | VCO 12-1 |
| Ka band | 33.4~34.7 | OSC 11-2 (double freq.) | VCO 12-1, 2, 3 |
| Ka band | 34.7~36.0 | OSC 11-3 (double freq.) | VCO 12-1, 2, 3 |

As it is clear from this table, it can be directly determined from the use of first local oscillators 11-2 and 11-3 that the received band is a Ka band, and there is no need to know the oscillation frequency of second local oscillator 12. However, whether the reception band is an X band or a K band must be determined from the oscillation frequency of second local oscillator 12-1.

FIG. 3 is a view explaining the operations of the device in FIG. 7. In FIG. 3, SAW Wave Gen. is a saw wave repeated within a fixed period T1 which is output from saw wave generator 10. FIG. 3 shows four periods A, B, C and D. TMG is the output signal of comparator 18. Comparator 18 compares the saw wave in FIG. 4 with a certain threshold value Vth (which is the voltage corresponding to the timing of switching from the X band to the K band), then outputs an H level signal if the output from saw wave generator 10 is smaller than the threshold value Vth, and outputs an L level signal if the output is greater than Vth. RD Sig IN is the output of a signal detected by FM detector 8. In FIG. 3, a signal S1 is being detected during the period of timing T3 of period A. In other words, a radar signal of the K band is being detected.

The next operations will be explained by referring to FIG. 3.

Saw wave generator 10 generates periodical signals as shown in FIG. 3. When receiving a radar signal during the frequency sweep of the second local oscillator, a waveform appears in the output of FM detector 8 at the moment the second IF frequency becomes a predetermined frequency. This waveform is pulse shaped via comparator 9 and provided to sweep signal generator 10 and M-COM 14.

M-COM conducts the distinction of the received radar band through the operating state of the first and second local oscillators 11 and 12 at the time of generation of an input of a pulse signal in the RD Sig IN terminal.

For example, when signal S1 is detected as shown in FIG. 3, OSC 11-1 operates to generate a double frequency, and if VCO 12-1 is operating at a voltage from the threshold value Vth upwards, it is clear from the above chart that signal S1 is a received signal of the K band. Furthermore, the frequency value may be measured by checking the voltage level of the SAW Wave Gen. waveform at that time.

FIG. 4 shows the frequency sweep characteristics of VCO 12-1.

The threshold value Vth in FIG. 3 corresponds to V5 in FIG. 4. In other words, when the sweep voltage is 0~V5, the radar detector in FIG. 7 receives an X band signal (range of X2 in FIG. 4), and if the sweep voltage is V5~10, it receives a K band signal (range of K2 in FIG. 4).

As shown above, the received radar band is determined through a combination of the operations of the first local oscillator and the second local oscillator.

Furthermore, a microwave detector covering the X band, K band and Ka band, as in FIG. 7, is disclosed in Patent Laid-Open Publication Hei 7(1995)-35845.

However, the received bands X2 and K2 in FIG. 4 are usually set to a wider range than the actual received bands X1 and K1. That is, when setting the received bands, the actual IF frequencies of the X and K received bands are, as described above, X=0.95~1.0, K=1.05~1.25 GHz, and each of these are V1~V2 and V3~V4 in FIG. 4. The reason why the received bands X2 and K2 are set wider than the actual received bands X1 and K1 is to guarantee that the received bands X and K are covered (X1, K1) despite any irregularities, since the sweep frequencies of the VCOs are irregular due to their mass production.

When trying to overcome these irregularities in the sweep frequency of the VCO through the method described above, a receiver covering a very wide frequency band range will be designed in comparison to the actual specifications of the received bands. A resulting problem is that mistaken operations will become more frequent through hindrance waves, etc., due to the wide received band area.

The problem above may be overcome by setting threshold values for V1, V2, V3 and V4, respectively, and supplying the TMG pulses to the M-COM, but this requires a great number of COMPs (voltage comparators) and M-COM ports, so that the circuit size and price will become an issue. Recently, a new safety radar band (safety warning system) has been provided within the K band, so considering that a greater number of additional COMP circuits are required for distinguishing this band, this problem is relevant for the designing and manufacturing steps.

SUMMARY OF THE INVENTION

The present invention functions to solve the problems above, and aims at providing a radar detector for detecting radar signals by conducting a frequency sweep over a wide range via VCO circuits, wherein the frequency precision of the received bands may be improved by using comparatively simple and inexpensive circuits.

The radar detector according to the present invention comprises an antenna for receiving radar signals, a voltage controlled oscillator which receives a controlled signal and generates a signal of a frequency corresponding thereto, a receiving section which demodulates the radar signal received by said antenna based on the output signal of said voltage controlled oscillator, a sweep signal generating section which generates and supplies a sweep signal to said voltage controlled oscillator as said controlled signal, a memory section which stores data indicating the relation between said sweep signal and oscillating frequency in advance, and a controlling section which, after detecting a radar signal demodulated by said receiving section, decides the received frequency of said radar signal by comparing the controlled signal of said voltage controlled oscillator with the data in said memory section.

The radar detector adjusting system according to the present invention comprises said radar detector, a data measuring and write-in device comprising a controlled signal generating means for supplying a controlled signal to the voltage controlled oscillator of said radar detector and a data read-in means for reading data into the memory section of said radar detector under predetermined conditions when said voltage controlled oscillator generates a predetermined frequency, and a frequency measuring device for measuring the oscillation frequency of said voltage controlled oscillator of the radar detector.

The radar detector adjusting method according to the present invention comprises a first step of conducting the setting of the radar received band, a second step of setting the oscillation frequency of the voltage controlled oscillator of said radar detector to a predetermined frequency, a third step of converting the controlled voltage of said voltage controlled oscillator to a digital value when the frequency setting has been conducted at said second step, and a fourth step of storing said converted data in the memory section of said radar detector, wherein said first through fourth steps are repeated until the setting of all radar received bands has been conducted.

DESCRIPTION OF THE PREFERRED EMBODIMENTS

A radar detector according to an embodiment of the present invention will be explained by reference to the drawings.

Figure 1:
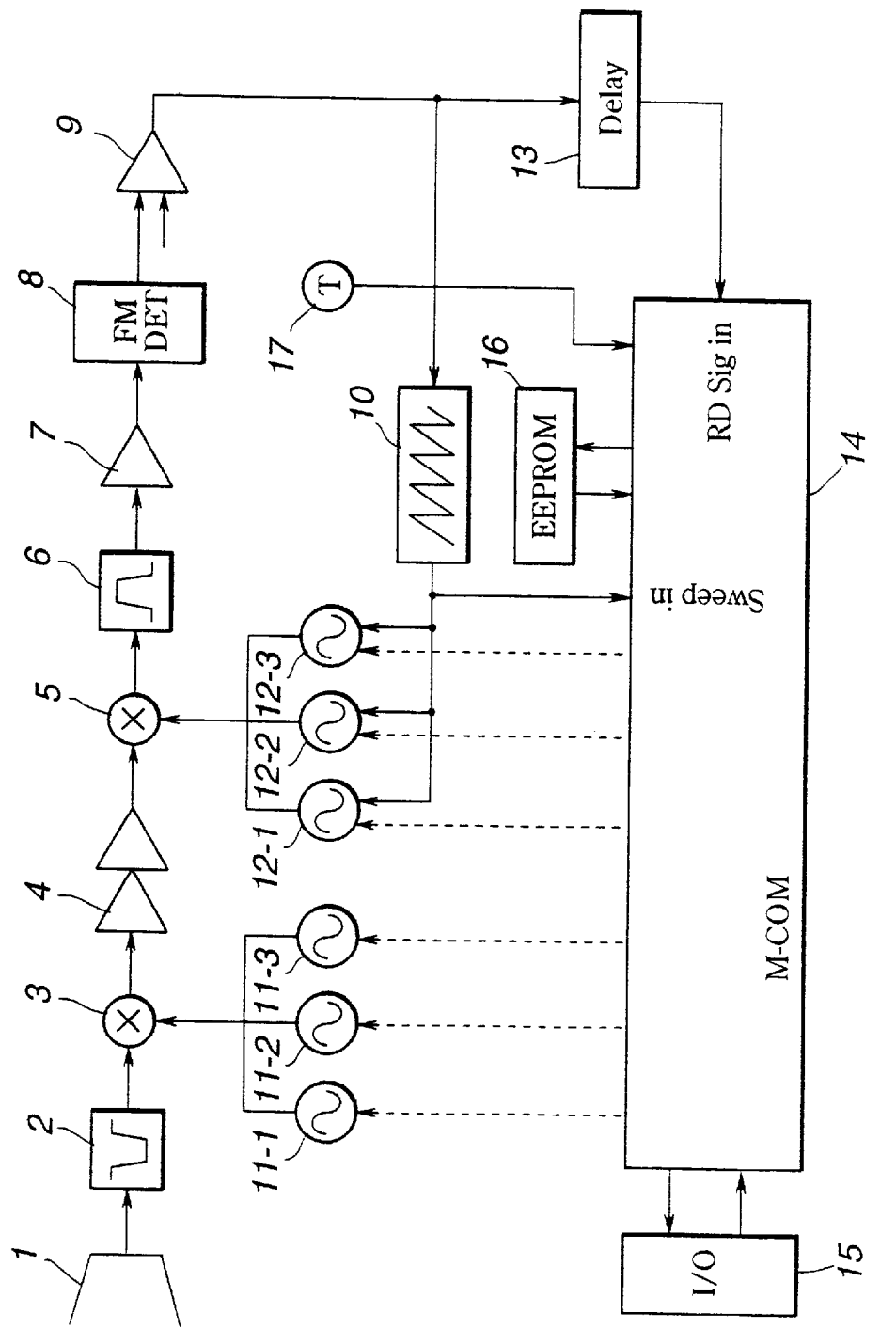
FIG. 1 is a block diagram of the radar detector functions according to an embodiment of the present invention.

FIG. 1 is a block diagram of the functions of the device according to an embodiment of the present invention.

The high frequency signal from a radar gun (not illustrated) received by the antenna (ANT) 1 is input into mixer (MIX) 3 after removing signals of a predetermined band via band rejection filter (BRF) 2. At mixer 3, the received high frequency signal is mixed with the output signal of one of local oscillators (OSC) 11-1~11-3, and a signal is output which has a frequency of the difference of the frequencies of the mixed signals (first intermediate frequency signal). The output signal of mixer 3 is amplified by intermediate frequency amplifier (IFA) 4, and input to mixer 5. At mixer 5, the intermediate frequency signal output from mixer 3 is mixed with the output signal from one of voltage controlling oscillators (VCO) 12-1~12-3, and a signal is output which has a frequency of the difference of the frequencies of the mixed signals (second intermediate frequency signal). Only the signal of a desired frequency band is taken out via band pass filter (BPF) 6 from the output of mixer 5, which is then amplified via amplifier (AMP) 7, and then input into FM detector (FMDET) 8. The output from FM detector 8 is compared with a predetermined threshold value to judge the existence of a received signal via comparator (COMP) 9, and only a signal from this threshold value upwards is output. The output from comparator 9 is input into saw wave generator 10 and delay means 13. Saw wave generator 10 generates a saw wave signal at predetermined intervals, and supplies it to VCO 12. This saw wave signal becomes the frequency sweep signal of the radar detector. Furthermore, when receiving a detected signal from comparator 9, saw wave generator 10 temporarily stops the voltage sweep. This is in order to determine whether the signal detected at comparator 9 is a radar signal or merely a noise by successively conducting the radar signal detection in the frequencies where a signal has been detected. If it is a true radar signal, it can be expected that a signal will be successively detected at comparator 9. After a predetermined period of time has passed, saw wave generator 10 recommences its operation.

The output from saw wave generator 10 and that of delay means 13 are input respectively in the Sweep in terminal (e.g. the A/D port of a M-COM for converting analog values to digital values) and the RD Sig in terminal (e.g. the input port of the M-COM) of the controlling M-COM (M-COM: microprocessor) 14. M-COM 14 controls local oscillator 11 and voltage controlled oscillator 12 based on the output of saw wave generator 10, the output of delay means 13, the data of EEPROM 16 wherein the relation between the voltage of the sweep signal to be supplied to VCO 12 and the oscillation frequency is stored in advance for each VCO, and the output signals of temperature sensor 17 such as a thermocouple, a thermistor, or a semiconductor sensor, etc., and calculates and outputs the detected results to input/output section (I/O) 15. Furthermore, M-COM 14 receives controlling signals, etc. from input/output section 15. Temperature sensor 17 is provided in order to compensate for the changes in characteristics of the VCO 12 due to temperature changes.

For example, the following data are stored in advance in EEPROM (Electrically Erasable Programmable Read-Only Memory) 16. The generation and storage of these data will be described later.

(1) Threshold voltage data for the VCO sweep control voltage:

X band lower threshold voltage: V1;

upper threshold voltage: V2

K band lower threshold voltage: V3;

upper threshold voltage: V4

These data differ for each manufactured product, so that they are separately measured and written in during the manufacturing process.

(2) Temperature detection setting data:

| |
|---|
| Compensation value for 10° C. or more below base temperature |
| Δ V1 |
| Compensation value for 10° C.~40° C. above base temperature |
| Δ V2 |
| Compensation value for 40° C.~60° C. above base temperature |
| Δ V3 |
| Compensation value for 60° C. or more above base temperature |
| Δ V4 |

(3) Temperature compensation data for temperature sensor:

| |
|---|
| Offset value for 10° C. below base temperature |
| OFST 1 |
| Offset value for 10° C. above base temperature |
| OFST 2 |
| Offset value for 40° C. above base temperature |
| OFST 3 |
| Offset value for 60° C. above base temperature |
| OFST 4 |

Furthermore, the data in (2) and (3) are representative data obtained by measuring many samples, and the same data are written in for each product.

Figure 2:
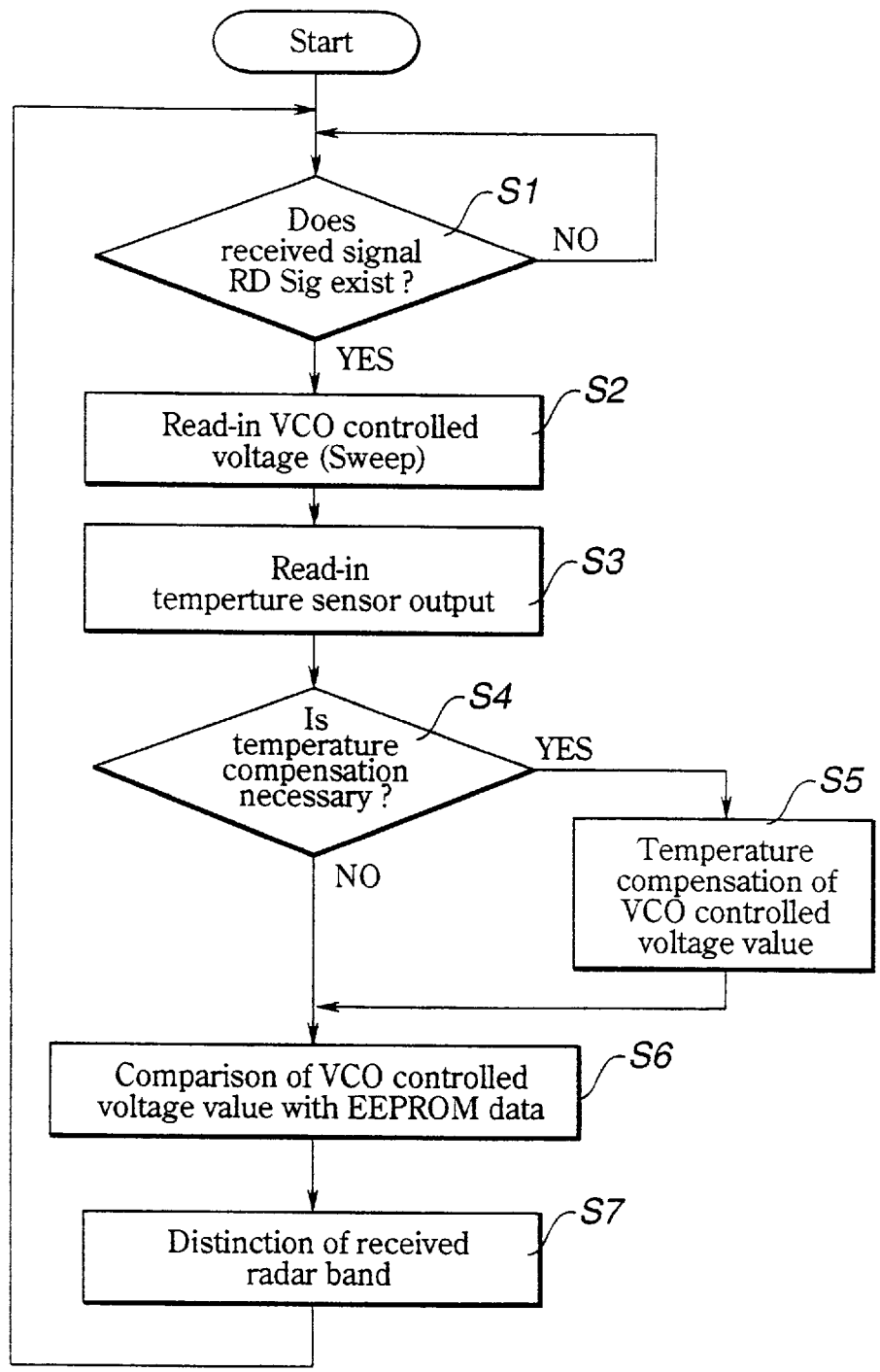
FIG. 2 is a flow chart of the radar detector operations according to an embodiment of the present invention.
Figure 3:
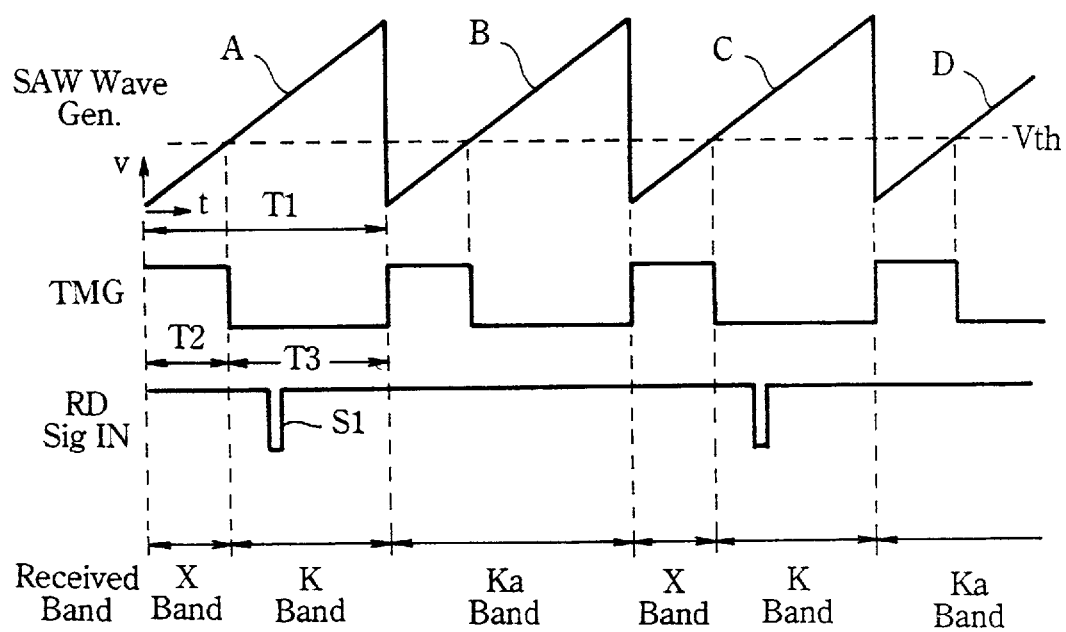
FIG. 3 is a timing chart of the radar detector operations.
Figure 4:
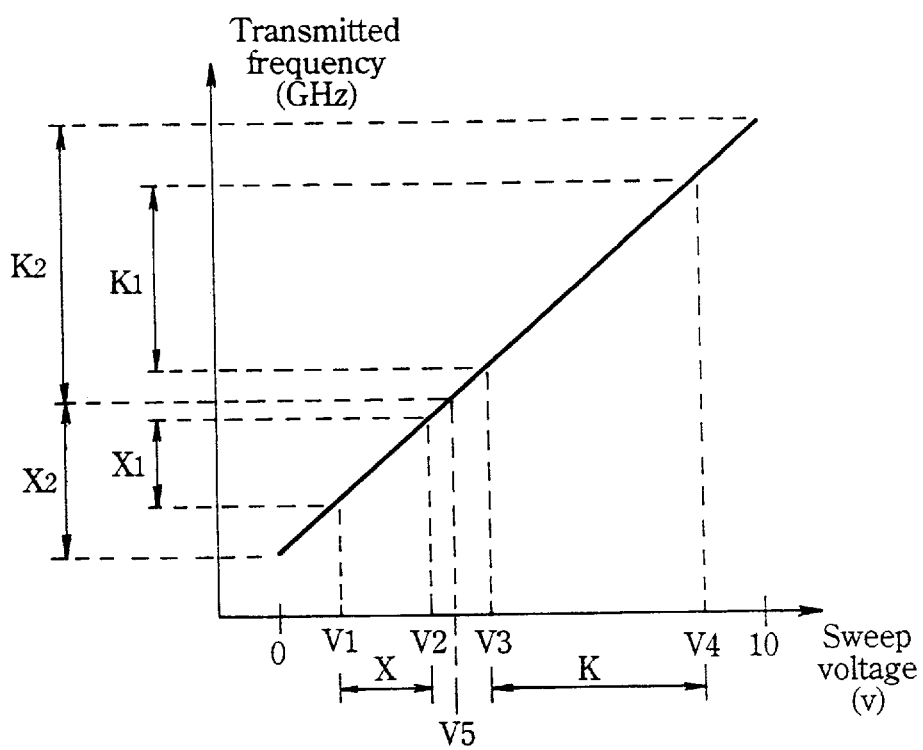
FIG. 4 is an example of the characteristics of the voltage controlled oscillator (VCO) regarding the sweep oscillation frequency and the sweep voltage.

FIG. 2 is a flow chart of the operations of the radar detector according to the present embodiment 1. FIG. 3 is also a timing chart of the operations. FIG. 4 is an example of the characteristics of VCO 12-1 regarding the sweep oscillation frequency and the sweep voltage.

The relation between the received frequency of each radar band and the operation frequency of the radar detector is as follows:

| Received band | Received frequency | First local oscillator (GHz) | First IF frequency |
|---|---|---|---|
| X band | 10.525 ± 0.025 | 11.5 | 0.975 ± 0.025 |
| K band | 24.150 ± 0.1 | 11.5 × 2 = 23.0 | 1.150 ± 0.1 |
| Ka band | 33.4~34.7 | 16.2 × 2 = 32.4 | 1.0~2.3 |
| Ka band | 34.7~36.0 | 16.85 × 2 = 33.7 | 1.0~2.3 |

The oscillation frequency of OSC 11-1 is 11.5 GHz, that of OSC 11-2 is 16.2 HGz, and that of OSC 11-3 is 16.85 GHz.

From the above relationship, it is clear that the same local oscillator 11-1 is used for the X and K bands, but the IF frequencies differ. However, when receiving a K band signal, a second harmonic is used which is double the basic oscillation frequency of local oscillator 11-1. Also, since the Ka band covers a very wide range from 33.4~36.0 GHz, two first local oscillators 11-2, 11-3 are employed to set the IF frequency to 1~2.3 GHz. When receiving a Ka band signal, a second harmonic is used which is double the basic oscillation frequency of local oscillators 11-2, 11-3.

The second IF frequency is usually set to a fixed frequency of some ten MHz. Accordingly, the oscillation frequency of VCO 12-1 is set to 950~1.3 GHz, that of VCO 12-2 to 1.3~1.8 GHz, and that of VCO 12-3 to 1.8~2.3 GHz. Using these frequencies, the frequency range of the second IF frequency (some ten MHz) subtracted from the first IF frequency range is subject to frequency sweep.

Concluding from the above, the combination between the first and second local oscillators and the relation to the received band is as follows:

| Received band | Received frequency (GHz) | First local oscillator | First IF frequency |
|---|---|---|---|
| X band | 10.525 ± 0.025 | OSC 11-1 | VCO 12-1 |
| K band | 24.150 ± 0.1 | OSC 11-1 (double wave) | VCO 12-1 |
| Ka band | 33.4~34.7 | OSC 11-2 (double wave) | VCO 12-1, 2, 3 |
| Ka band | 34.7 ± 36.0 | OSC 11-3 (double wave) | VCO 12-1, 2, 3 |

As can be seen from the table above, it can be directly distinguished that the received band is a Ka band from the use of the first local oscillator 11-2, 3, without requiring the oscillating frequency of the second local oscillator 12. However, the determination whether the received band is an X band or a K band requires the oscillation frequency of the second local oscillator 12-1.

Next, the operations of the radar detector according to embodiment 1 of the present invention will be explained by reference to the flow chart in FIG. 2.

S1: M-COM 14 monitors the RD Sig in terminal and judges the existence of a received signal RD Sig which is at a certain level or higher. For example, when a signal such as S1 in FIG. 3 is detected, M-COM 14 determines the existence of a received signal. In this case, it proceeds to step S2. If it is not detected, this step S1 is repeated.

S2: M-COM 14 reads in the input VCO controlling voltage (sweep voltage of saw wave generator 10) from the Sweep in terminal, and converts the analogue value to digital value.

S3: M-COM 14 reads in the output voltage of temperature sensor 17 and converts the analogue value to digital value. At this time, the temperature compensation of the temperature sensor itself is conducted. For example, when the temperature is 10° C. below the base temperature, M-COM 14 reads out an offset value OFST 1 corresponding thereto from the EEPROM 16 and conducts the temperature compensation by adding this value to the digital temperature value.

Furthermore, this step does not need to be in this sequence, and for example, S2 and S3 may be exchanged. As the temperature change is comparatively gradual, this step does not need to be conducted each time, but only occasionally (e.g., every several minutes).

S4: M-COM 14 judges whether temperature compensation is necessary or not. For example, when the temperature is within ±10° C. from the base temperature, it proceeds to step S6 since no temperature compensation is required. In other cases, it proceeds to step S5 because temperature compensation is required. This temperature range is merely an example, and it goes without saying that this range differs according to the concrete temperature characteristics of the VCO and the required functions of the system (measurement precision or stability).

S5: M-COM 14 temperature compensates the VCO controlled voltage value. For example, if the temperature is 10° C.~40° C. above the base temperature, M-COM 14 reads out the corresponding compensation value A V2 from EEPROM 16, and conducts the temperature compensation by adding this value to the VCO controlled voltage. Even if the VCO controlled voltage valued changes due to this processing, such changes may be controlled.

S6: The VCO controlled voltage value is compared with the data of EEPROM 16, i.e., M-COM 14 compares the threshold value of the VCO controlled voltage, which is stored in EEPROM 16, with voltage data V1, V2, V3 and V4.

S7: M-COM 14 decides the received radar band based on the comparison results of step S6. For example, assuming the lower threshold voltage is V1 and the upper threshold voltage is V2 for the X band, and the lower threshold voltage is V3 and the upper threshold voltage is V4 for the K band, the following distinction results may be obtained.

V1<VCO controlled voltage<V2:X band
V3<VCO controlled voltage<V4:K band

This relation corresponds with the graph in FIG. 4. As is clear from this graph, these voltages V1~V4 correspond to the minimum necessary range of the bands, and do not cover any surplus (e.g. the area between V2 and V3). Accordingly, mistaken operations due to noises and the like are less likely to arise. Furthermore, these data from V1~V4 will be measured for each product and stored in the EEPROM, so that a very precise received radar band judgment is possible without requiring any complicated adjustments.

Also, in the device according to embodiment 1 of the AWE present invention, since the VCO sweep voltage threshold values are treated as EEPROM-written data regardless of their increase in number, the circuit size and component price are not affected in any way. Therefore, it is easy to correspond to an increase in the number of received radar bands. Assuming the number of received radar bands increases and the structure applied is a plurality of COMPs (voltage comparing circuit) lined up, this would necessitate an adjustment of the same number of base voltages as the COMPs, but the present newly proposed method requires no such adjustment, enabling even the automatic measurement of the VCO characteristics, and is also characterized in providing an improved mass production.

Furthermore, as the VCO characteristics are written in the EEPROM as data for each product, there is no irregularity in the received frequency of the products.

In short, according to embodiment 1 of the present invention, the characteristics of the VCO regarding the relation between the sweep voltage and the frequency are written in as data in an EEPROM, the VCO sweep voltage is A/D converted at the reception of the radar signals, and the received radar band or received frequency is determined by their comparison with the EEPROM data. As a result, the above problems of circuit size, threshold value adjustment and component price may be resolved.

Next, a device for writing in the data in the EEPROM of the embodiment of the present invention and the method thereof will be explained.

Figure 5:
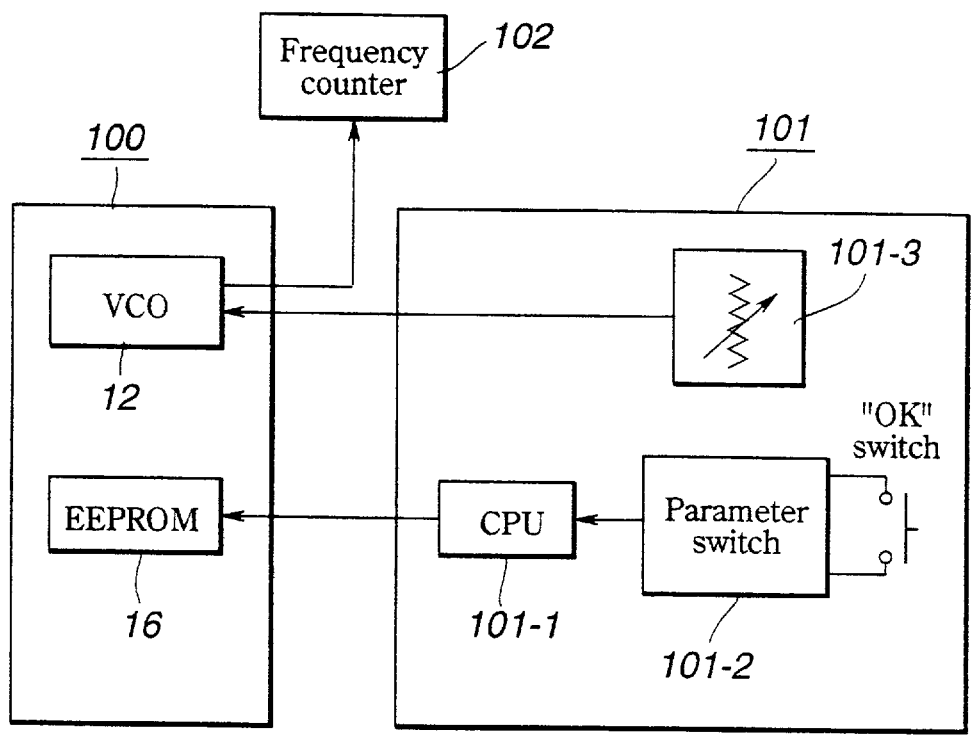
FIG. 5 shows the data measurement and writing system of the EEPROM according to an embodiment of the present invention.

FIG. 5 shows the data measurement and write-in system of the EEPROM of embodiment 2 of the present invention. In this drawing, reference numeral 100 is the radar detector according to embodiment 1 of the present invention which has an integrated VCO 12 and EEPROM 16. Reference numeral 101 is a device for data measurement and write-in, and comprises a CPU 101-1 for controlling and data write-in, a parameter switch 101-2 for setting various parameters, and a voltage generating means 101-3 for generating the controlled voltage of the VCO. Parameter switch 101-2 comprises XLo, XHi, KLo, KHi, KaLo and KaHi switches (not shown) for setting the radar bands, a TEMP switch for temperature setting, an EEPROM Dump switch for dump output of the memory contents, an OK switch for giving instructions for the writing in a memory, a RESET switch for resetting data, and other switches, and a variable resistor for adjusting the bias of the VCO, etc. Voltage generating means 101-3 comprises a variable resistor, etc., and is able to generate an arbitrary voltage within the range of the sweep voltage of the VCO. Voltage generating means 101-3 is equivalent to the saw waveform generator 10. Reference numeral 102 is a frequency counter for measuring the oscillation frequency of VCO 12.

The operator of the device sets the parameter for the data to be stored in the EEPROM through parameter switch 101-2, and operates the volume of voltage generating means 101-3, thereby being able to adjust the voltage to be applied to VCO 12. Further, by reading out the frequency indicated on the indicator of frequency counter 102, the operator is informed of the oscillating frequency of VCO 12. At the desired oscillating frequency (e.g. the maximum and minimum frequencies of X1 and K1 in FIG. 4), the voltage value thereof is written into the EEPROM.

Figure 6:
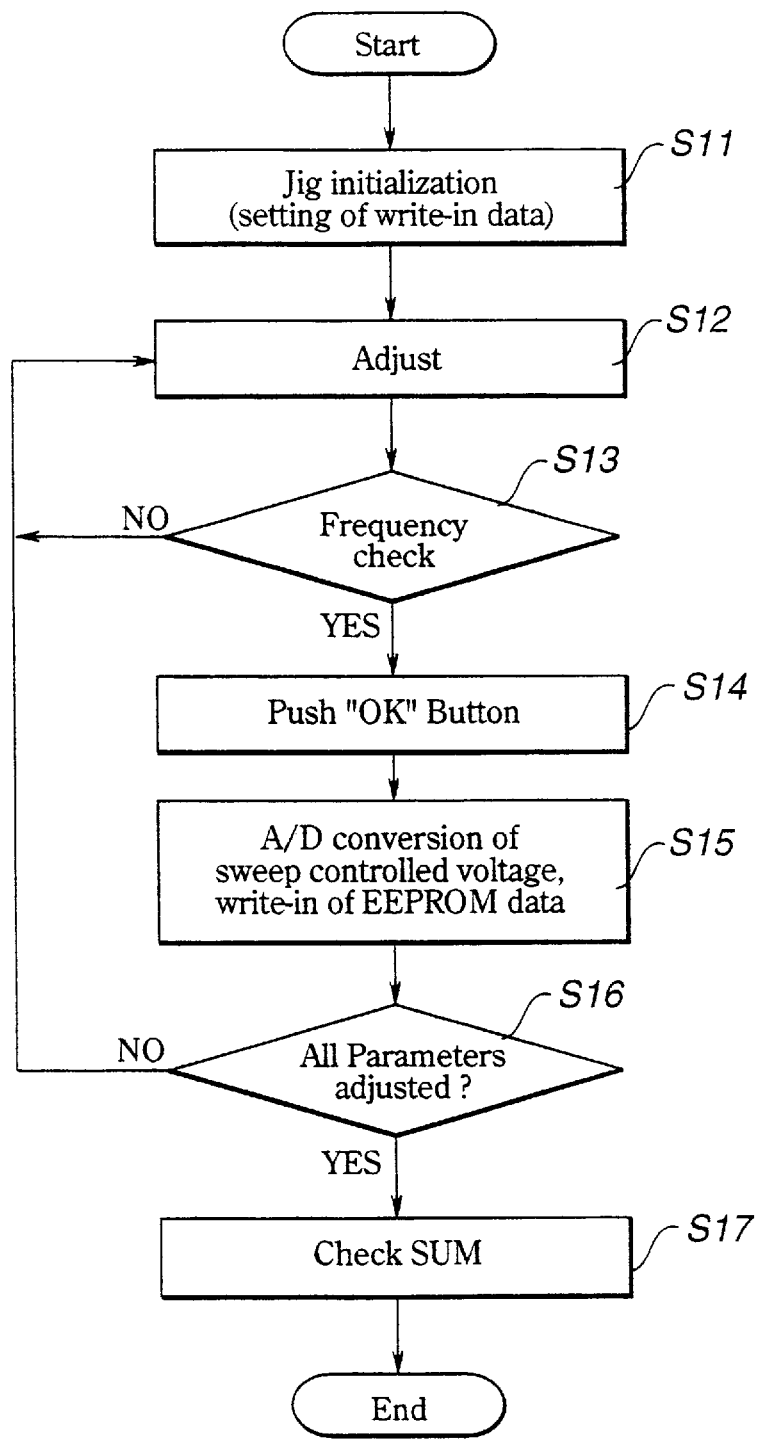
FIG. 6 is a flow chart of the data measurement and writing processing of the EEPROM according to an embodiment of the present invention.
Figure 7:
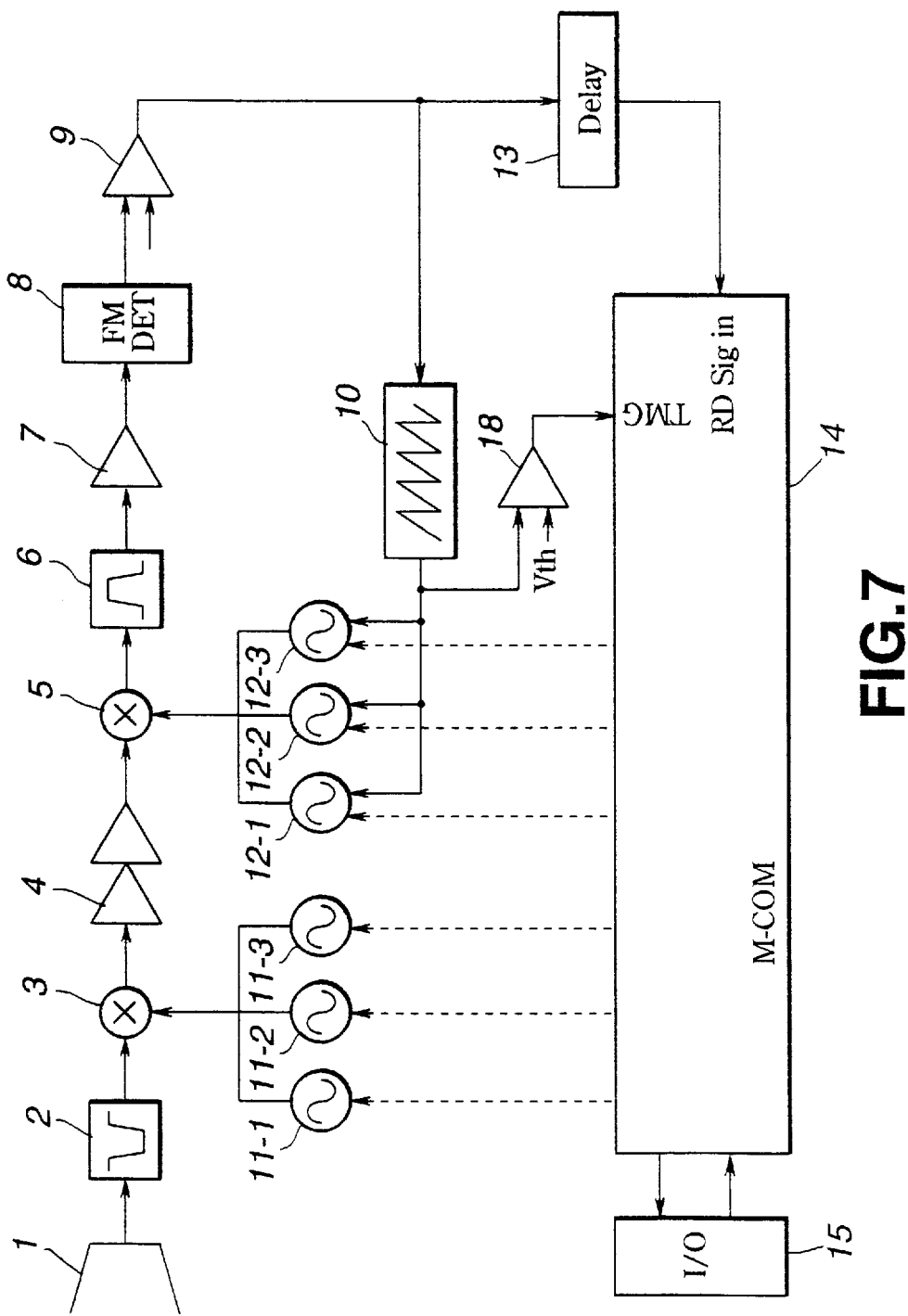
FIG. 7 is an example of a 3-band radar detector structure.

This procedure will be explained by referring to the flow chart in FIG. 6.

S11: The parameter switch 101-2 is initialized. For example, when setting the minimum frequency of the X band, XLo is set on. Similarly, when setting the maximum of the X band and the minimum and maximum of the K band, XHi, KLo and KHi, are set on. The VCO bias is set in accordance with the actual operation state.

S12: The VCO sweep voltage is adjusted so that the VCO oscillation frequency becomes the prescribed frequency. As the VCO oscillation frequency changes by adjusting the variable resistance of voltage generating means 101-3, frequency counter 102 monitors this frequency and adjusts the variable resistance.

S13: The frequency is checked. If the VCO oscillating frequency is set to the prescribed frequency (YES), it proceeds to step S14, and if not, it returns to step S12 and continues with the adjustment.

S14: The operator pushes the "OK" button. By setting the "RESET" button, the setting may be recommenced from the start again.

S15: By pushing the "OK" button, the write-in of data is conducted. In other words, the sweep voltage (VCO controlled voltage) is A/D converted and this data is written into EEPROM.

S16: It is determined whether the adjustment has been made for all parameters. That is, if the data regarding the VCO controlled voltage value for all radar bands (e.g., X, K bands) and all temperature ranges has been written into EEPROM (YES), it proceeds to step S17. If not (NO), it returns to step S12 and conducts the adjustment for parameters which have not yet been set.

S17: The check sum of the written in data (sum of data due to mistaken detection) is calculated and written into EEPROM, thereby ending the process.

As shown above, the measuring device (setting device) and method thereof according to embodiment 2 of the present invention enables the effective operation of storing VCO voltage data of the received radar band in an EEPROM based on the actual oscillating frequency—sweep voltage characteristics. By specifying the received radar band based on these stored data, the precision of the frequency of the received band can be improved by using simple and inexpensive circuits.

In the description above, the setting of the parameters and the adjustment of the VCO controlled voltage was conducted manually, but they may be structured so as to be automatically controlled via a CPU. By automatically conducting the radar detector's VCO voltage data write-in, the operation can be made more effective.

The entire disclosure of Japanese Patent Application No. 9-57843 filed on Mar. 12, 1997 including specification, claims, drawings and abstract are incorporated herein by reference in its entirety.

What is claimed is:

1. A radar detector comprising:
   an antenna for receiving radar signals;
   a voltage controlled oscillator which receives a controlled signal and generates a signal of a frequency corresponding thereto;
   a receiving section which demodulates the radar signal received by said antenna based on the output signal of said voltage controlled oscillator;
   a sweep signal generating section which generates and supplies a sweep signal to said voltage controlled oscillator as said controlled signal;
   a memory section which stores data indicating the relation between said sweep signal and oscillating frequency in advance; and
   a controlling section which, after detecting a radar signal demodulated by said receiving section, determines the received frequency of said radar signal by comparing the controlled signal of said voltage controlled oscillator with the data in said memory section.

2. A radar detector according to claim 1, further comprising a temperature sensor for detecting the internal temperature, wherein said memory section includes temperature compensation data for conducting temperature compensation, and said controlling section decides the received frequency of said radar signal based on said temperature compensation data.

3. A radar detector according to claim 1, wherein said memory section stores data which indicate the relation between the maximum and minimum frequencies of the received band and said sweep signal, and said controlling section decides the received frequency of said radar signal by checking whether the controlled signal of said voltage controlled oscillator is within the range of said maximum frequency to said minimum frequency based on the data of said memory section.

4. A radar detector according to claim 3, wherein said receiving section conducts the processing over a wide range of bands, said memory section stores data indicating the relation between the maximum and minimum frequencies and said sweep signal for each band within said plurality of bands, and said controlling section decides the received frequency of said radar signal by checking whether the controlled signal of said voltage controlled oscillator is within the range of said maximum frequencies through said minimum frequencies based on the data of said memory section.

5. A radar detector according to claim 1, wherein said receiving section comprises a FM detector and a comparator for shaping the output of said FM detector to waveform and then outputting this signal as a radar signal, wherein said controlling section is a microprocessor, and this microprocessor conducts the detection of the controlled signal of said voltage controlled oscillator through an A/D port and the detection of said radar signal through an input port.

6. A radar detector according to claim 5, wherein said comparator compares the output of said FM detector with a predetermined threshold value, and outputs signals from this threshold value upwards as radar signals.

7. A radar detector according to claim 5, wherein, when said comparator outputs a radar signal, the sweep signal generator temporarily suspends the sweeping, said microprocessor monitors the number of times said radar signal is detected and, when said radar signal has been detected more than once, determines the received frequency of said radar signal by comparing the controlled signal of said voltage controlled oscillator with the data in said memory.

8. A radar detector according to claim 1, wherein said memory stores the minimum and maximum voltages of the X band and the minimum and maximum voltages of the K band with regard to the characteristics of said voltage controlled oscillator in the relation between the voltage and the oscillating frequency.

9. A radar detector according to claim 2, wherein said memory stores a first voltage compensation value to be applied if the internal temperature is 10° C. or more below base temperature, a second voltage compensation value to be applied if 10° C.~40° C. above the base temperature, a third voltage compensation value to be applied if 40° C.~60° C. above the base temperature, and a fourth voltage compensation value to be applied if 60° C. or more above the base temperature.

10. A radar detector according to claim 2, wherein said memory stores temperature compensation data for conducting temperature compensation of said temperature sensor.

11. A radar detector according to claim 10, wherein said memory stores a first temperature compensation value to be applied if the internal temperature is 10° C. below base temperature, a second temperature compensation value to be applied if 10° C. above the base temperature, a third temperature compensation value to be applied if 40° C. above the base temperature, and a fourth temperature compensation value to be applied if 60° C. above the base temperature.

12. A radar detector adjusting system, comprising:
a radar detector comprising
  an antenna for receiving radar signals,
  a voltage controlled oscillator which receives a controlled signal and generates a signal of a frequency corresponding thereto,
  a receiving section which demodulates the radar signal received by said antenna based on the output signal of said voltage controlled oscillator,
  a sweep signal generating section which generates and supplies a sweep signal to said voltage controlled oscillator as said controlled signal,
  a memory section which stores data indicating the relation between said sweep signal and oscillating frequency in advance, and
  a controlling section which, after detecting a radar signal demodulated by said receiving section, decides the received frequency of said radar signal by comparing the controlled signal of said voltage controlled oscillator with the data in said memory section;
a data measuring and write-in device comprising
  a controlled signal generator for supplying a controlled signal to the voltage controlled oscillator of said radar detector, and
  a data writer for writing data into the memory section of said radar detector under predetermined conditions when said voltage controlled oscillator generates a predetermined frequency; and
a frequency measuring device for measuring the oscillation frequency of said voltage controlled oscillator of the radar detector.

13. A radar detector adjusting system according to claim 12, wherein said data writer writes in the corresponding controlled voltage values into the memory section of said radar detector when said voltage controlled oscillator oscillates at the minimum and maximum frequencies of the X band and the minimum and maximum frequencies of the K band, respectively.

14. A radar detector adjusting system according to claim 12, wherein said data writer writes in the controlled voltage value of said voltage controlled oscillator into the memory section of said radar detector to be applied if the internal temperature is 10° C. below, 10° C. above, 40° C. above and 60° C. above the base temperature, respectively.

15. A radar detector adjusting system according to claim 12, wherein said data measuring and write-in device comprises a microprocessor for setting parameters and controlling the voltage controlled oscillator, and wherein said microprocessor controls said data writer.

16. A radar detector adjusting method for a radar detector which comprises an antenna for receiving radar signals, a voltage controlled oscillator which receives a controlled signal and generates a signal of a frequency corresponding thereto, a receiving section which demodulates the radar signal received by said antenna based on the output signal of said voltage controlled oscillator, a sweep signal generating section which generates and supplies a sweep signal to said voltage controlled oscillator as said controlled signal, a memory section which stores data indicating the relation between said sweep signal and oscillating frequency in advance, and a controlling section which, after detecting a radar signal demodulated by said receiving section, decides the received frequency of said radar signal by comparing the controlled signal of said voltage controlled oscillator with the data in said memory section, said radar detector adjusting method comprising:
a first step of conducting the setting of the radar received band;
a second step of setting the oscillation frequency of the voltage controlled oscillator of said radar detector to a predetermined frequency;
a third step of converting the controlled voltage of said voltage controlled oscillator to a digital value when the frequency setting has been conducted at said second step; and
a fourth step of storing said converted data in the memory section of said radar detector,
wherein said first through fourth steps are repeated until the setting of all radar received bands has been conducted.

* * * * *